United States Patent [19]

Schlueter, Jr. et al.

[11] Patent Number: 5,549,193
[45] Date of Patent: Aug. 27, 1996

[54] ENDLESS SEAMED BELT

[75] Inventors: Edward L. Schlueter, Jr.; Thomas C. Parker, both of Rochester; Robert M. Ferguson, Penfield; Robert N. Finsterwalder, Webster, all of N.Y.

[73] Assignee: Xerox Corporation, Stamford, Conn.

[21] Appl. No.: 297,206

[22] Filed: Aug. 29, 1994

[51] Int. Cl.⁶ .................................................. B65G 15/30
[52] U.S. Cl. .......................................................... 198/844.2
[58] Field of Search ........................................... 198/844.2

[56] References Cited

U.S. PATENT DOCUMENTS

| 4,034,617 | 7/1977 | Guyer | 198/844.2 X |
| 5,246,100 | 9/1993 | Stone et al. | 198/844.2 |

FOREIGN PATENT DOCUMENTS

| 569621 | 4/1924 | France | 198/844.2 |
| 58042 | 9/1967 | German Dem. Rep. | 198/844.2 |
| 362753 | 2/1973 | U.S.S.R. | 198/844.2 |

*Primary Examiner*—D. Glenn Dayoan
*Attorney, Agent, or Firm*—Samuel Mott; Annette L. Bade

[57] ABSTRACT

An endless flexible seamed belt formed by joining two ends of the material from which the belt is fabricated is provided, the belt having at least one overlapping, butting, interlocking joint to form the endless belt, each end of the at least one overlapping butting, joint, contains a pair of interlocking members having a male projection and a female receptacle geometrically oriented so that the female receptacle on the first end receives the male projection on the second end and the male projection on the first end is received by the female receptacle on the second end to form a joint between the first and second ends, at least one receptacle being formed within and having a substantial depth in a portion of the belt material at the belt ends, at least one projection and receptacle pair being sized and shaped to form at least one pair of mutually mating elements in a combination overlapping, butting and interlocking joint to form the endless belt.

15 Claims, 4 Drawing Sheets

ENDLESS SEAMED BELT

CROSS REFERENCE TO RELATED APPLICATIONS

Attention is hereby directed to U.S. patent application Ser. No. 08/522,622 (D/93563) entitled "Puzzle Cut Seamed Belt With Strength Enhancing Strip" in the name of Thomas C. Parker et al.; U.S. Pat. application Ser. No. 08/297,203 (D94227) entitled "Puzzle Cut Seamed Belt With Bonding Between Adjacent Surfaces" in the name of Edward L. Schlueter Jr., et al.; U.S. patent application Ser. No. 08/297,201 (D/94225) entitled "Endless Belt With UV Cured Puzzle Cut Seam" in the name of Lawrence J. Lynd et al.; U.S. patent application Ser. No. 08/297,200 (D/94226) entitled "Endless Puzzle Cut Seamed Belt", in the name of Edward L. Schlueter Jr., et al., all commonly assigned to the assignee of the present invention.

BACKGROUND OF THE INVENTION

The present invention is directed to an endless flexible seamed belt having improved seam quality and smoothness with a low thickness differential between the seamed portion of the belt and the adjacent portions of the belt.

Perhaps, the most important invention that may have ever been made was that of the wheel. Arguably, one of the follow-on inventions of almost equal importance was directed to a belt. Initially, the belts were fabricated by taking two ends of a web material and fastening them together by a variety of techniques such as sewing, wiring, stapling, providing adhesive joints, etc. While such joined or seamed belts are suitable for many applications, such as the delivery of rotary motion from a source such as a motor, to implement a device such as a saw blade, they are not as satisfactory in many of the more sophisticated applications of belt technology in common practice today. In the technology of the current day many applications of belts require much more sophisticated qualities and utilities and in particular for such special applications as in electrostatographic and electrographic imaging apparatus and processes for use as photoreceptors, intermediate sheet and/or image transport devices, fusing members or transfix devices, it is ideal to provide a seamless belt whereby there is no seam in the belt which mechanically interferes with any operation that the belt performs or any operation that may be performed on the belt. While this is ideal the manufacture of seamless belts requires rather sophisticated manufacturing processes which are expensive and are particularly more sophisticated, difficult and much more expensive for the larger belts. As a result, various attempts have been made to provide seamed belts which can be used in these processes. Previous attempts to manufacture seamed belts have largely relied on belts where the two ends of the belt material have been lapped or overlapped to form the seam or have butted against one another and then fastened mechanically by heat or other means of adhesion such as by the use of an adhesive or ultrasonic welding.

The belts formed according to the typical butting technique while satisfactory for many purposes are limited in bonding, strength and flexibility because of the limited contact area formed by merely butting or overlapping the two ends of the belt material. Furthermore, belts formed according to the butting or overlapping technique provide a bump or other discontinuity in the belt surface leading to a height differential between adjacent portions of the belt of 0.010 inches or more depending on the belt thickness, which leads to performance failure in many applications. For example, one of the most severe problems involves cleaning the imaging belt of residual toner after transfer of the toner image. Intimate contact between the belt and cleaning blade is required. With a bump, crack or other discontinuity in the belt the tuck of the blade is disturbed which allows toner to pass under the blade and not be cleaned. Furthermore, seams having differential heights may when subjected to repeated striking by cleaning blades cause the untransferred, residual toner to be trapped in the irregular surface of the seam. Photoreceptors which are repeatedly subjected to this striking action tend to delaminate at the seam when the seam is subjected to constant battering by the cleaning blade. As a result, both the cleaning life of the blade and the overall life of the photoreceptor can be greatly diminished as well as degrading the copy quality. In addition, such irregularities in seam height provide vibrational noise in xerographic development which disturbs the toner image on the belt and degrades resolution and transfer of the toner image to the final copy sheet. This is particularly prevalent in those applications requiring the application of multiple color layers of liquid or dry developer on a photoreceptor belt, which are subsequently transferred to a final copy sheet.

In these sophisticated applications, it is desired to provide a seam height differential between the seam and the unseamed adjacent portions less than 0.001 inch. In addition, the presence of the discontinuity in belt thickness reduces the tensile strength of the belt which for prolonged use is desirably 80–90% that of the parent material unseamed. Furthermore, it is desired that the seamed belt have seam mechanical bonding, strength and flexibility capable of satisfactory performance for at least 500,000 cycles. In addition, the discontinuity or bump in such a belt may result in inaccurate image registration during development, inaccurate belt tracking and overall deterioration of motion quality, as a result of the translating vibrations.

While the above-identified cross-referenced applications deal with sophisticated techniques wherein it is desired to provide a seam height differential between the seam and the unseamed adjacent portions less than 0.001 inch, there are, however many less sophisticated applications wherein a seamed belt having a seam height differential less than the combined thicknesses of two ends of the belt is entirely adequate and it is to that embodiment that the particular invention described herein is directed. Such applications may include photoreceptor belts, fusing belts, intermediate and transfer belts for xerographic applications, transport belts for document and paper handling belts.

SUMMARY OF THE INVENTION

Accordingly, it is a principle object of the present invention to provide a seamed belt with a relatively low thickness differential between the seam and the rest of the belt.

In accordance with a principle aspect of the present invention the belt is made by joining two ends of the material from which the belt is fabricated, each end having an overlapping, butting, interlocking joint to form an endless belt.

In a further principle aspect of the present invention each end of the at least one overlapping, butting joint comprises a pair of interlocking members having a male projection and a female receptacle geometrically oriented so that the female receptacle on the first end receives the male projection on the second end and the male projection on the first end is received by the female receptacle on the second end to form a joint between the first and second ends and the receptacles in the respective ends being formed and having a substantial depth in a portion of the belt material to reduce the seam height differential of the belt with the projections and receptacles being sized and shaped to form at least one pair of mutually mating elements in a combination overlapping, butting and interlocking joint to form the endless belt.

In a further aspect of the present invention there are a plurality of overlapping, butting, interlocking, joints to form the seam for the endless belt.

In a further aspect of the present invention the endless flexible seamed belt, the overlapping, butting, interlocking joints are of substantially the same dimension along the seam and are uniformly spaced along the length of the seam.

In a further aspect of the present invention the plurality of overlapping, butting, interlocking joints are unevenly spaced and may be of a different dimension along the length of the seam.

In a further aspect of the present invention each pair of mutually mating elements are of the same size and configuration laterally and longitudinally across the seam.

In a further aspect of the present invention the dimensional tolerances between the male projection and female receptacle are less than between 0.0005 inches and 0.002 inches.

In a further aspect of the present invention the male projections and female receptacles are in a mechanical interference fit.

In a further aspect of the present invention the male projections and female receptacles are joined together in some manner, typically by the application of heat and/or pressure or with the use of a physically and chemically compatible material.

In a further aspect of the present invention the belt thickness differential between the seamed portion is about 50% greater than the thickness of the adjacent unseamed portion belt.

In a further aspect of the present invention the edges of the lapped ends of the belt are tapered to form a more uniform intersection between overlapped ends and in a preferred embodiment are rounded to provide a more uniform transition between overlapped ends.

DESCRIPTION OF PREFERRED EMBODIMENT

Figure 1:
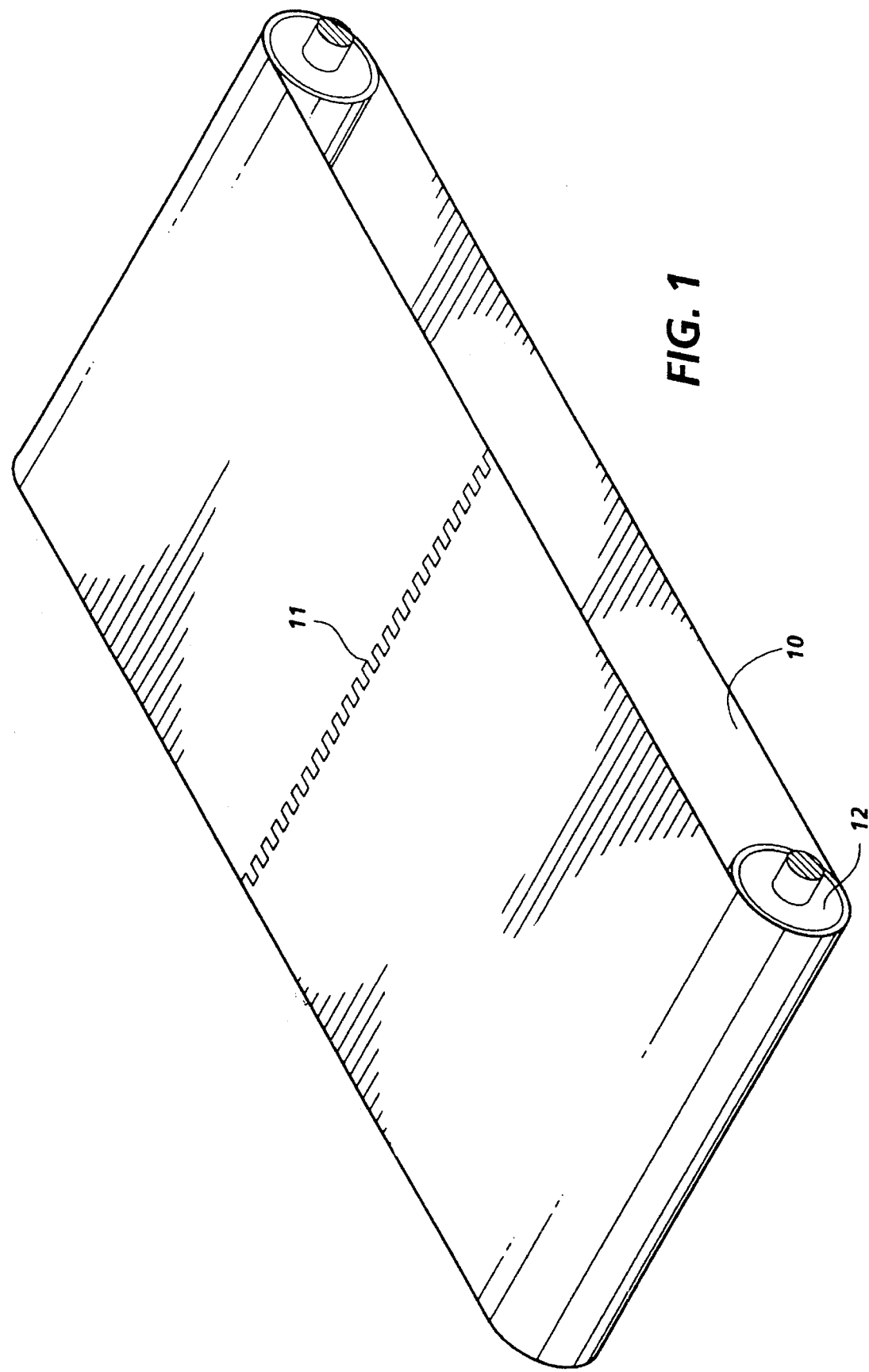
FIG. 1 is an isometric representation of the flexible seamed belt formed according to the present invention providing at least one overlapping, butting, interlocking joint to form the endless belt. While the seam is illustrated as being perpendicular to the two parallel sides of the belt, it will be understood that it may be angled or slanted with respect to the parallel sides of the belt.

With continued reference to the figures and additional reference to the following description, the invention will be described in greater detail. A seam formed according to the present invention is one of enhanced strength, flexibility and mechanical life, and while it does have a small height differential between the seamed portion and the unseamed portions adjacent to the seamed portion, it has application for a variety of industrial purposes. FIG. 1 is illustrative of belt 10 having a seam 11, the belt being driven around rollers 12.

The endless flexible seamed belt may be made of any suitable material. Typical materials include, photoreceptor materials which may be multilayered such as those described in U.S. Pat. No. 4,265,990, as well as a variety of thermoplastic and thermosetting belt materials. Any suitable belt material may be employed. Typical materials include polyesters, polyurethanes, polyimides, polyvinyl chloride, polycarbonates, acrylics, polyolefins such as polyethylene and polypropylene and polyamides such as nylon. In addition, elastomeric materials such as silicones, fluoroelastomers such as Vitons (E. I. DuPont™), EPDM and nitriles etc. For certain purposes metallic cloth and even paper may be used. The belt material is selected according to its intended use to have the appropriate physical characteristics such as tensile strength, Young's modulus, electroconductivity, thermal conductivity and stability, flex strength and in certain applications, such as transfix, being capable of being subjected to high temperatures. Other important characteristics of the belt material include surface energy desired low for good toner release, for example, gloss, dielectric constant and strength.

Figure 2:
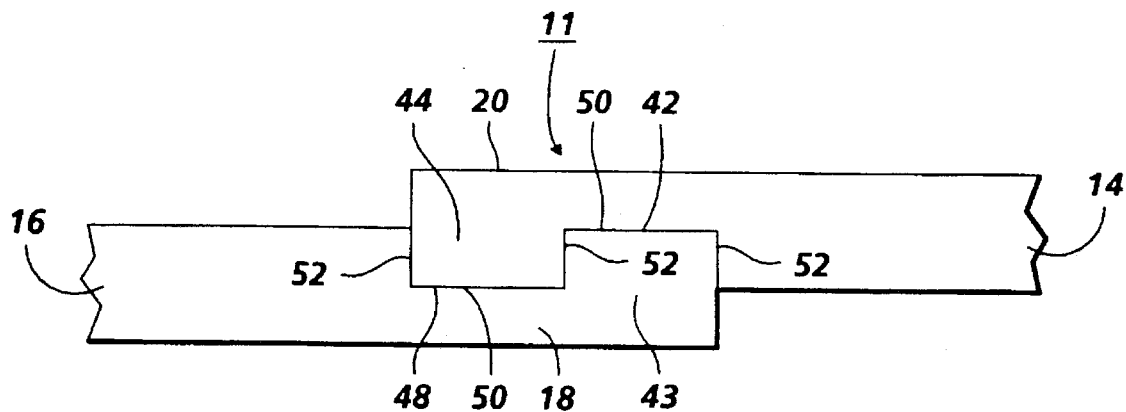
FIG. 2 is an enlarged side view of an embodiment of the overlapping, butting, interlocking joint used to form the endless belt according to the present invention.
Figure 3:
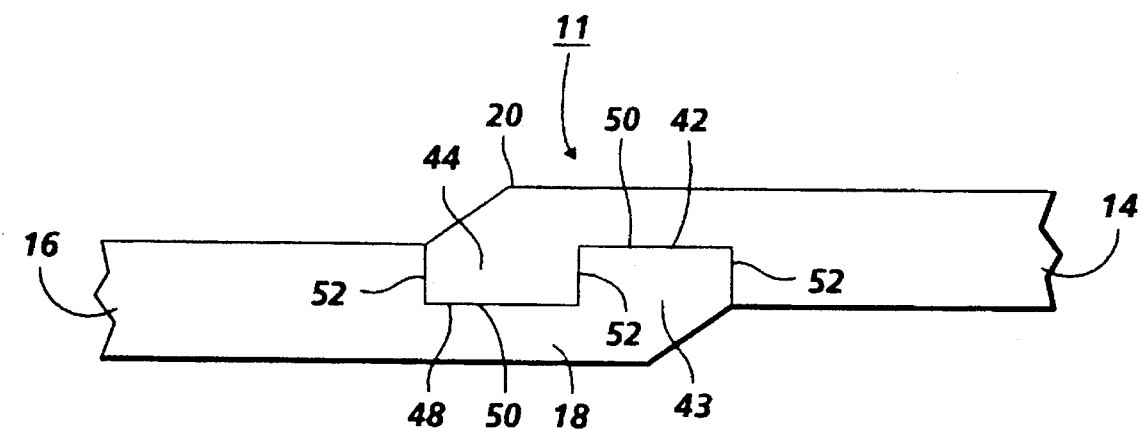
FIG. 3 is a further enlarged side view of an embodiment, of an overlapping, butting, interlocking joint to form an endless belt of FIG. 2 wherein the lap ends of the belt are tapered to form a more uniform intersection between overlapped ends.
Figure 4:
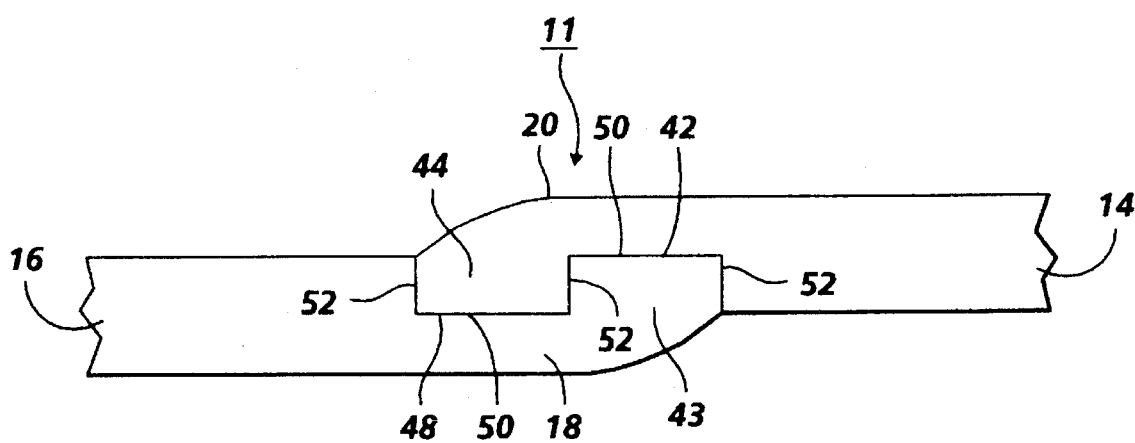
FIG. 4 is a further alternative embodiment side view wherein any surface differential between the lapped ends of the belts are rounded to provide a more uniform transition between the overlapped ends.

The pattern of the overlapping, butting and interlocking joint may be formed in any suitable manner such as by cutting with a blade or knife or by more sophisticated techniques including die cutting or laser cutting with commercially available lasers such as a $CO_2$ laser or excimer laser generating a beam of sufficient width and intensity that within an acceptable time will provide the desired cut. Following cutting, it can be deburred and cleaned by air, ultrasonics or brushing if necessary. The overlapping, butting, interlocking joint may take any suitable form as long as it's geometry is intended to reduce the overall thickness of a purely overlapping seam. As illustrated in FIGS. 2, 3 and 4, the belt joint 11 generally takes the form of two belt ends or elements 14, 16 forming a pair of interlocking members 18, 20 to form the butting, overlapping joints each member of which has a male projection and a female receptacle geometrically oriented so that the female receptacle 42 on the first end 14 receives the male projection 43 on the second end 16 of the belt and the male projection on the first end 44 is received by the female receptacle 48 on the second end 16 to form a joint between the first and second ends. In this regard, in order to reduce the height differential between the seamed portion and the adjacent, unseamed portions, it is desirable to have the female receptacles formed within their individual members at a substantial depth in a portion of the belt at the belt ends. In order for the overlapping at 50, butting at 52, interlocking joint to function properly, it is appropriate that the mutually mating elements in the joint be sized and shaped to substantially the same form. Typically, and particularly with respect to the embodiments illustrated in the Figures, the thickness differential of the belt between the seamed portion is about 50% greater than the adjacent unseamed portions of the belt. This, however, may vary depending upon depth of the female receptacles in the mating elements forming the joint.

Figure 5:
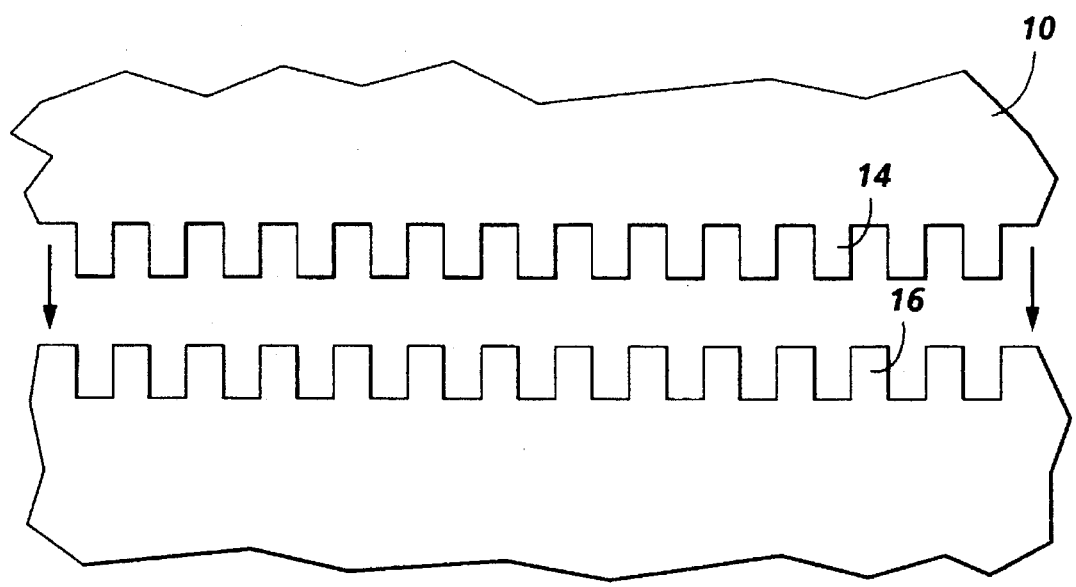
FIG. 5 is a top view of the belt shown in the isometric view of FIG. 1 prior to joining the two ends of the belt wherein the uniformly sized and spaced male projections are inserted into the uniformly spaced and sized female receptacles.
Figure 6:
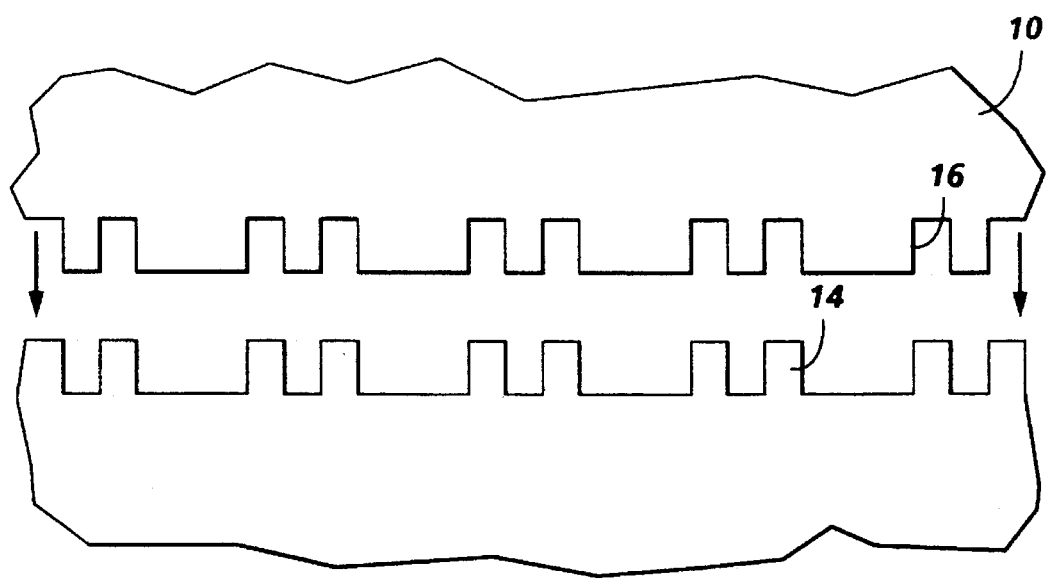
FIG. 6 is a top view similar to that of FIG. 5 wherein the male projections and female receptacles are not uniformly spaced along the length of the seam. In this regard it should also be noted that not only may they not be uniformly spaced but individual pairs of male projections and female receptacles may be non-uniformly sized.

Typically, the seam is formed by a plurality of the overlapping, butting, interlocking joints 11 which may on the one hand be of substantially uniform size and spacing between individual mating elements 14 and 16 as illustrated in FIG. 5, or alternatively may be of different spacing as illustrated in FIG. 6 and may also be of different sizes. The uniform sizing and spacing is preferred as it tends to distribute distress in the seam more uniformly along the length of the seam. The preferred embodiment however is to have each of the plurality of overlapping, butting, interlocking joints be of substantially the same size and evenly spaced along the length of the seam. Typically, the seam width is from about 1 mm to about 3 mm wide, although this may vary depending on roll diameter, material modulus and other parameters.

The two ends of the belt material are joined by physically placing them together in the overlapping, butting, interlocking relationship. This may require the application of pressure to properly seat or mate the interlocking elements. Typically, the dimensional tolerances between the male projection and the female receptacle are between 0.0005 inches and 0.002 inches. In a more preferred embodiment the seam is formed by a plurality of interlocking joints. The male projections and female projections are in a mechanical interference fit or alternatively have been joined together, preferably by the application of heat and/or pressure to more firmly bond the mutually interlocking elements. Alternatively, the various surfaces of the overlapping, butting and interlocking seam may be joined by any conventional adhesive which is physically and chemically compatible with the belt material. Following fabrication, the belt may be finished by way of buffing or sanding and further, may have a suitable overcoating applied to control electrical properties, release properties, etc., which coating is typically of a thickness of 0.001 to 0.003 inch in thickness. While this can be initially applied to an already formed belt and the seamed area filled from the back of the belt to maintain the uniformity of the functional surface, it is preferred and by far the most economical manner is to coat the belt material and then seam it.

Thus, according to the present invention, an endless flexible seamed belt is formed which has a substantially reduced height differential between the seam and the unseamed portions of the belt adjacent to the seam. The belt is fabricated by having a plurality of mutually mating elements to provide the overlapping, butting, interlocking joint provided by a pair of interlocking members which includes one member having a male projection and a female receptacle geometrically oriented so that the female receptacle on the first end receives the male projection on the second end and the male projection on the first end is received by the female receptacle on the second end to form the joint between the first and second end.

The above cross referenced patent applications together with the patents cited herein are hereby incorporated by reference in their entirety in the instant application.

While the above invention has been described with reference to specific embodiments it is not intended to be limited thereto but rather those skilled in the art will recognize that variations and modifications may be made therein which are within the spirit of the scope and the appended claim.

It is claimed:

1. An endless flexible seamed belt formed by joining two ends of a material from which the belt is fabricated, said belt having a plurality of overlapping, butting, interlocking joints to form the endless belt, each end of the overlapping butting, joints, comprising a pair of interlocking members comprising a male projection and a female receptacle geometrically oriented so that the female receptacle on the first end receives the male projection on the second end and the male projection on the first end is received by the female receptacle on the second end to form a joint between said first and second ends, said receptacle being formed within and having a substantial depth in a portion of the belt material at the belt ends, said projection and receptacle pair being sized and shaped to form at least one pair of mutually mating elements in a combination overlapping, butting and interlocking joint to form the endless belt.

2. The endless flexible seamed belt of claim 1 wherein each of the overlapping, butting, interlocking joints are substantially the same dimension along the seam and are uniformly spaced along the length of the seam.

3. The endless flexible seamed belt of claim 1 wherein the plurality of overlapping, butting, interlocking joints are unevenly spaced along the length of the seam.

4. The endless flexible seamed belt of claim 3 wherein at least one of the overlapping, butting, interlocking joints is nonuniformly sized.

5. The endless flexible seamed belt of claim 1 wherein each of said pair of said mutually mating elements are of the same size and configuration laterally and longitudinally across the seam.

6. The endless flexible seamed belt of claim 1 wherein the height differential between the seam and the adjacent unseamed portions of the belt is substantially less than that for a seam formed by overlapping two seam ends.

7. The endless flexible belt of claim 1 wherein said male projections and said female receptacles are in a mechanical interference fit.

8. The endless flexible belt of claim 1 wherein the thickness differential of the belt between the seamed portion is about 50% greater than the adjacent unseamed portion of the belt.

9. The endless flexible seamed belt of claim 1 wherein said male projection and said female receptacles are joined together.

10. The endless flexible seamed belt of claim 1 wherein said male projection and said female receptacles are joined together by the application of heat.

11. The endless flexible seamed belt of claim 1 wherein said male projection and said female receptacle are joined together by the application of heat and pressure.

12. The endless flexible seamed belt of claim 1 wherein said male projection and said female receptacles are joined by an adhesive which is physically and chemically compatible with the belt material.

13. The endless flexible seamed belt of claim 1 wherein the surface edges of the lapped ends of the belt are tapered to form a more uniform intersection between overlapped ends.

14. The endless flexible seamed belt of claim 13 wherein any surface differential between the lapped ends of the belt are rounded to provide a more uniform transition between overlapped ends.

15. An endless flexible seamed belt formed by joining two ends of a material from which the belt is fabricated, said belt having at least one overlapping, butting, interlocking joint to form the endless belt, each end of said at least one overlapping, butting, interlocking joint, comprising a pair of interlocking members comprising a male projection and a female receptacle geometrically oriented so that the female receptacle on the first end receives the male projection on the second end and the male projection on the first end is received by the female receptacle on the second end to form a joint between said first and second ends, said receptacle being formed within and having a substantial depth in a portion of the belt material at the belt ends, wherein dimensional tolerances between said male projection and female receptacle are from about 0.0005 inches to about 0.002 inches, said projection and receptacle pair being sized and shaped to form at least one pair of mutually mating elements in a combination overlapping, butting and interlocking joint to form the endless belt.

* * * * *